United States Patent
Howell et al.

(10) Patent No.: US 9,809,302 B2
(45) Date of Patent: Nov. 7, 2017

(54) DIFFERENTIAL BRAKING OF AIRCRAFT LANDING GEAR WHEELS

(71) Applicants: AIRBUS OPERATIONS LIMITED, Bristol (GB); AIRBUS OPERATIONS SAS, Toulouse (FR)

(72) Inventors: George Howell, Bristol (GB); Livier Ben, Toulouse (FR); Louis-Emmanuel Romana, Toulouse (FR)

(73) Assignees: AIRBUS OPERATIONS LIMITED, Bristol (GB); AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 14/802,268

(22) Filed: Jul. 17, 2015

(65) Prior Publication Data

US 2016/0016661 A1    Jan. 21, 2016

(30) Foreign Application Priority Data

Jul. 18, 2014    (GB) .................................... 1412769.0

(51) Int. Cl.
*B64C 25/48* (2006.01)
*B60T 8/00* (2006.01)
*B60T 8/24* (2006.01)
*B60T 8/17* (2006.01)
*B60T 8/32* (2006.01)

(52) U.S. Cl.
CPC ................ *B64C 25/48* (2013.01); *B60T 8/00* (2013.01); *B60T 8/1703* (2013.01); *B60T 8/246* (2013.01); *B60T 8/325* (2013.01)

(58) Field of Classification Search
CPC .......... B64C 25/48; B60T 8/1703; B60T 8/00; B60T 8/246; B60T 8/325
See application file for complete search history.

(56) References Cited

U.S. PATENT DOCUMENTS

| 4,646,242 | A | 2/1987 | Valaas |
| 5,707,118 | A | 1/1998 | Kolberg et al. |
| 2006/0186267 | A1 | 8/2006 | Steiner et al. |
| 2008/0001471 | A1 | 1/2008 | Rudd |
| 2008/0030069 | A1 | 2/2008 | Griffith et al. |
| 2008/0283660 | A1 | 11/2008 | Thompson |

(Continued)

FOREIGN PATENT DOCUMENTS

| EP | 1864878 A2 | 12/2007 |
| EP | 1886887 A1 | 2/2008 |

(Continued)

OTHER PUBLICATIONS

European Search Report dated Dec. 23, 2015 in European Application No. 15175748.

*Primary Examiner* — Redhwan K Mawari
*Assistant Examiner* — Alan D Hutchinson
(74) *Attorney, Agent, or Firm* — Hauptman Ham, LLP

(57) ABSTRACT

A method of braking left and right landing gear wheels on respective left and right sides of an aircraft. A desired left braking parameter (L) is received for the left wheel and a desired right braking parameter (R) is received for the right wheel. The left wheel is braked with a reduced left braking parameter (L') which is less than the desired left braking parameter (L), and the right wheel is braked with a reduced right braking parameter (R') which is less than the desired right braking parameter (R). A difference between the braking parameters is maintained so that L'−R'=L−R.

13 Claims, 4 Drawing Sheets

(56) References Cited

U.S. PATENT DOCUMENTS

| | | |
|---|---|---|
| 2012/0261980 A1 | 10/2012 | Hurst et al. |
| 2013/0245907 A1 | 9/2013 | Mckay |
| 2014/0180505 A1 | 6/2014 | Vaney et al. |
| 2014/0209739 A1 | 7/2014 | Mayolle et al. |

FOREIGN PATENT DOCUMENTS

| | | |
|---|---|---|
| EP | 2762405 A1 | 8/2014 |
| GB | 2437042 A | 10/2007 |
| WO | 9710131 A1 | 3/1997 |
| WO | 2007054715 A1 | 5/2007 |

DIFFERENTIAL BRAKING OF AIRCRAFT LANDING GEAR WHEELS

RELATED APPLICATIONS

The present application claims priority from Great Britain Application Number 1412769.0, filed Jul. 18, 2014, the disclosure of which is hereby incorporated by reference herein in its entirety.

FIELD OF THE INVENTION

The present invention relates to a method and associated control system for braking left and right landing gear wheels.

BACKGROUND OF THE INVENTION

A typical aircraft has landing gear comprising a plurality of wheeled landing gear assemblies which support the aircraft when it is on the ground. The landing gear assemblies are used to control the movement of the aircraft during ground manoeuvres such as landing, taxiing and take off. A typical large jet-powered aircraft includes a steerable nose landing gear (NLG) assembly located towards the front of the fuselage and a plurality of main landing gear (MLG) assemblies located rearwards of the NLG assembly and distributed laterally about the aircraft's plane of symmetry. The MLG assemblies typically each include one or more actuators which are operable to provide a braking force and/or driving force to decelerate and/or accelerate, respectively, the wheels of that MLG assembly.

In certain conditions the pilot of an aircraft may command differential braking of the left and right MLGs—higher braking of the left MLG giving a left turn and higher braking of the right MLG giving a right turn.

U.S. Pat. No. 4,646,242 discloses an automatic braking function which applies a constant deceleration during a de-rotation phase of an aircraft, which is the phase after the MLGs have touched down during landing but before the NLG has touched down. The automatic braking function is selected by the flight crew prior to landing by setting a deceleration selection switch to the desired deceleration level. A problem with the automatic braking function of U.S. Pat. No. 4,646,242 is that it makes no provision for differential braking.

SUMMARY OF THE INVENTION

A first aspect of the invention provides a method of braking left and right landing gear wheels on respective left and right sides of an aircraft, the method comprising: receiving a desired left braking parameter (L) for the left wheel; receiving a desired right braking parameter (R) for the right wheel; braking the left wheel with a reduced left braking parameter (L') which is less than the desired left braking parameter (L); braking the right wheel with a reduced right braking parameter (R') which is less than the desired right braking parameter (R); and maintaining a difference between the braking parameters so that L'−R'=L−R.

The first aspect of the invention also provides a braking control system programmed to control left and right brakes of an aircraft by: receiving a desired left braking parameter (L) for the left brake; receiving a desired right braking parameter (R) for the right brake; determining a reduced left braking parameter (L') which is less than the desired left braking parameter (L); determining a reduced right braking parameter (R') which is less than the desired right braking parameter (R), wherein L'−R'=L−R; and outputting the reduced braking parameters to the left and right brakes.

The first aspect of the invention reduces the amount of braking applied to the wheels (compared to the desired braking parameters) thereby limiting the risk of damage to the aircraft, whilst maintaining the difference between the braking parameters so that any desired differential braking is still applied despite the overall reduction in braking.

In the preferred embodiment of the invention described below with reference to Table 1, the first aspect of the invention is performed by the controller when it is in logic state B.

The reduced braking parameters may be applied regardless of the total braking (L+R) being commanded by the desired braking parameters, but in a preferred embodiment the method further comprises determining whether a sum (L+R) of the left and right desired braking parameters exceeds a threshold; braking the left and right wheels with the desired left and right braking parameters (L, R) respectively in response to a determination that the sum (L+R) does not exceed the threshold; and braking the left and right wheels with the reduced left and right braking parameters (L', R') respectively in response to a determination that the sum (L+R) exceeds the threshold. Thus in the preferred embodiment of the invention the reduced braking parameters are only applied if the sum (L+R) exceeds the threshold. The threshold may be fixed, or may depend on certain factors during a given flight, such as aircraft weight or speed.

A sum (L'+R') of the reduced braking parameters may vary, but more preferably it is substantially equal to the threshold.

A second aspect of the invention provides a method of braking first and second landing gear wheels on respective first and second sides of an aircraft, the method comprising: receiving a first desired braking parameter for the first wheel; receiving a second desired braking parameter for the second wheel, wherein the second desired braking parameter is lower than the first desired braking parameter; determining a differential braking parameter in accordance with a difference between the braking parameters; determining whether the differential braking parameter exceeds a threshold braking parameter; braking the first wheel with the differential braking parameter in response to a determination that the differential braking parameter does not exceed the threshold braking parameter; and braking the first wheel with the threshold braking parameter in response to a determination that the differential braking parameter does exceed the threshold braking parameter.

The second aspect of the invention also provides a braking control system programmed to control first and second brakes of an aircraft by: receiving a first desired braking parameter for the first brake; receiving a second desired braking parameter for the second brake, wherein the second desired braking parameter is lower than the first desired braking parameter; determining a differential braking parameter indicative of a difference between the desired braking parameters; determining whether the differential braking parameter exceeds a threshold braking parameter; outputting the differential braking parameter to the first brake in response to a determination that the differential braking parameter does not exceed the threshold braking parameter; and outputting the threshold braking parameter to the first brake in response to a determination that the differential braking parameter does exceed the threshold braking parameter.

The second aspect of the invention provides an alternative solution to the same problem as the first aspect of the invention—how to limit the risk of damage to the aircraft whilst maintaining the difference between the braking parameters so that any desired differential braking is still applied. If the differential braking parameter is less than the threshold then it is applied to the first wheel, but if it is greater then the amount of braking applied to the first wheel is limited to the threshold in order to avoid damage.

Typically the second wheel is not braked when the first wheel is braked with the differential and threshold braking parameters.

In the preferred embodiment of the invention described below with reference to Table 1, the second aspect of the invention is performed by the controller when it is in logic states C-F.

The following discussion relates to both aspects of the invention.

The braking parameters may be hydraulic pressure (in the case of a hydraulic braking system), braking torque, angular deceleration of the wheel, or any other suitable parameter indicative of the amount of braking being applied.

The desired braking parameters may be received from a computerised auto-braking system, but more preferably they are received from a human pilot via one or more user input devices such as pedals.

The method may be performed during low-speed taxiing, when the aircraft is in a de-rotation phase after landing in which the landing gear wheels are on the ground but a nose landing gear of the aircraft is not on the ground, or at any other time.

In a preferred embodiment the method further comprises determining whether the aircraft is in the de-rotation phase, and performing the method in response to a determination that the aircraft is in the de-rotation phase.

The desired braking parameters may be received directly as independent inputs from two pedals, or indirectly for example via a single control stick which inputs the sum (L+R) of the desired braking parameters by moving the control stick backwards and forwards, and inputs the difference (L−R) between the desired braking parameters by moving the control stick left and right.

Typically the landing gear wheels are on opposite sides of a plane of symmetry of an airframe of the aircraft. Preferably the wheels are spaced apart from the plane of symmetry by the same distance.

BRIEF DESCRIPTION OF THE DRAWINGS

Embodiments of the invention will now be described with reference to the accompanying drawings, in which.

DETAILED DESCRIPTION OF EMBODIMENT(S)

Figure 1A:
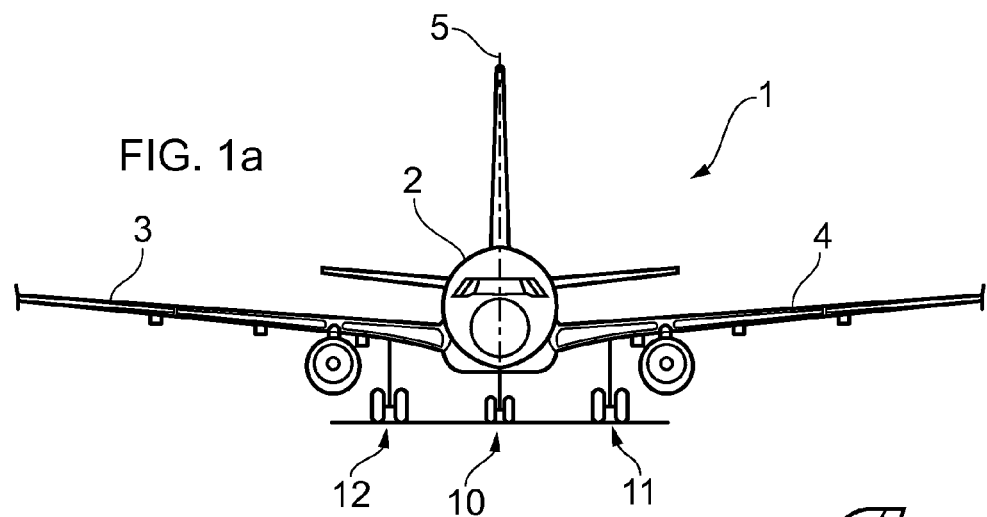
FIG. 1a is a front view of an aircraft.
Figure 1B:
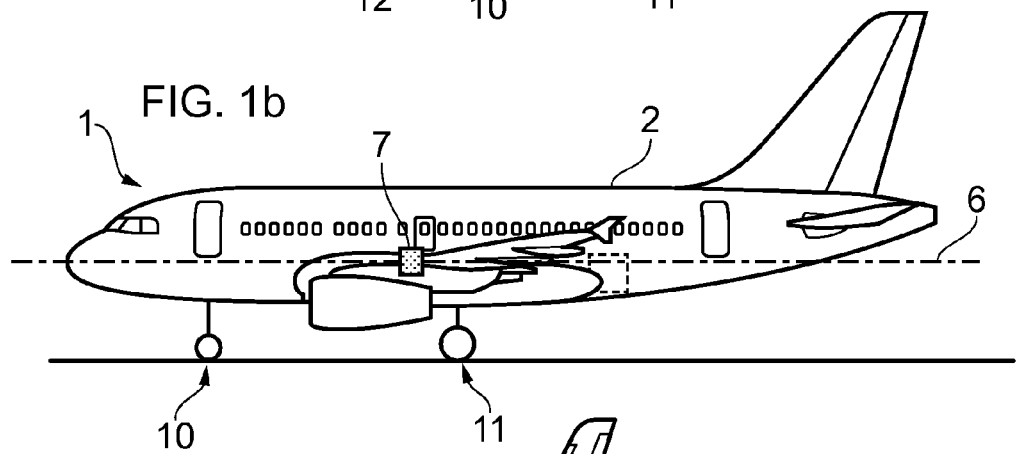
FIG. 1b is a left side view of the aircraft.
Figure 1C:
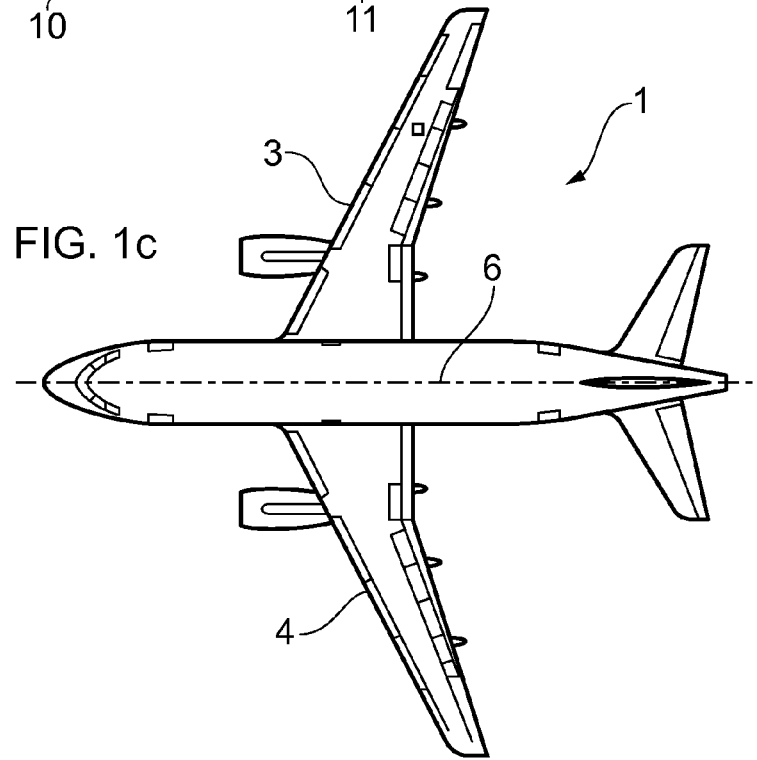
FIG. 1c is a plan view of the aircraft.

FIGS. 1a-c show an aircraft 1 having an airframe comprising a fuselage 2 with wings 3, 4 extending outwardly from the fuselage. The airframe has a plane of symmetry 5 containing a longitudinal axis 6 (also known as a roll axis). The aircraft 1 has a centre of gravity 7.

The aircraft has landing gear which supports the aircraft when it is on the ground and controls the movement of the aircraft during ground manoeuvres such as landing, taxiing and take off. The landing gear comprises a nose landing gear (NLG) assembly 10 forward of the centre of gravity 7, and a pair of port and starboard main landing gear (MLG) assemblies 11, 12 aft of the centre of gravity 7 and arranged either side of the plane of symmetry 5. In other embodiments, the aircraft may comprise further MLG assemblies, typically arranged in pairs and located either side of the plane of symmetry 5. The landing gear is usually retracted when the aircraft 1 is in flight, and extended before landing.

The NLG assembly 10 has a pair of steering wheels which may be rotated by a steering actuator to steer the aircraft. The nose wheel angle is defined as the angle between the direction in which the steering wheels are facing (that is the direction in which the wheels roll in a direction perpendicular to the axis of rotation) and the longitudinal axis 6 of the aircraft 1. The nose wheel angle may be varied to control the direction of travel of the NLG assembly 10, thereby controlling the heading of the aircraft. Optionally the MLG assemblies 11, 12 may also be steerable to control the heading of the aircraft.

The MLG assemblies 11, 12 each comprise a 4-wheeled bogie (alternatively, a 6-wheeled bogie or bogie with any number of wheels may be suitable) with brakes 13, 14 (shown in FIG. 2) capable of acting on the wheels to decelerate the bogie. Each brake 13, 14 applies a clamping force to a stack of carbon brake disks 13a, 14a (stators and rotors) to transfer a braking torque to the wheel, resulting in a longitudinal deceleration force being transferred to the bogie. Alternatively, or in addition, each brake may comprise a motor/generator operable to apply a driving/retarding force to the wheel to result in application of a longitudinal acceleration/deceleration force being transferred to the bogie.

The brakes 13, 14 of the MLG assemblies 11, 12 may be used to help steer the aircraft via differential braking, which is the intentional application of unbalanced braking forces either side of the aircraft plane of symmetry 5 to generate a net yaw moment to steer the aircraft. Differential braking may be achieved by applying different braking forces to each of the bogies of the MLG assemblies 11, 12.

Braking and steering operations may also be assisted by other systems, for example spoilers and other control surfaces and the aircraft's engines.

The brakes 13, 14 are powered by hydraulic pressure, a higher hydraulic pressure providing a higher braking torque. Specifically, each brake has a servo valve 13b, 14b which is controlled by an electric control signal on an input line 13c, 14c, the value of this control signal determining the hydraulic pressure on a hydraulic output line 13d, 14d which in turn applies the clamping force to the brake disks.

Figure 2:
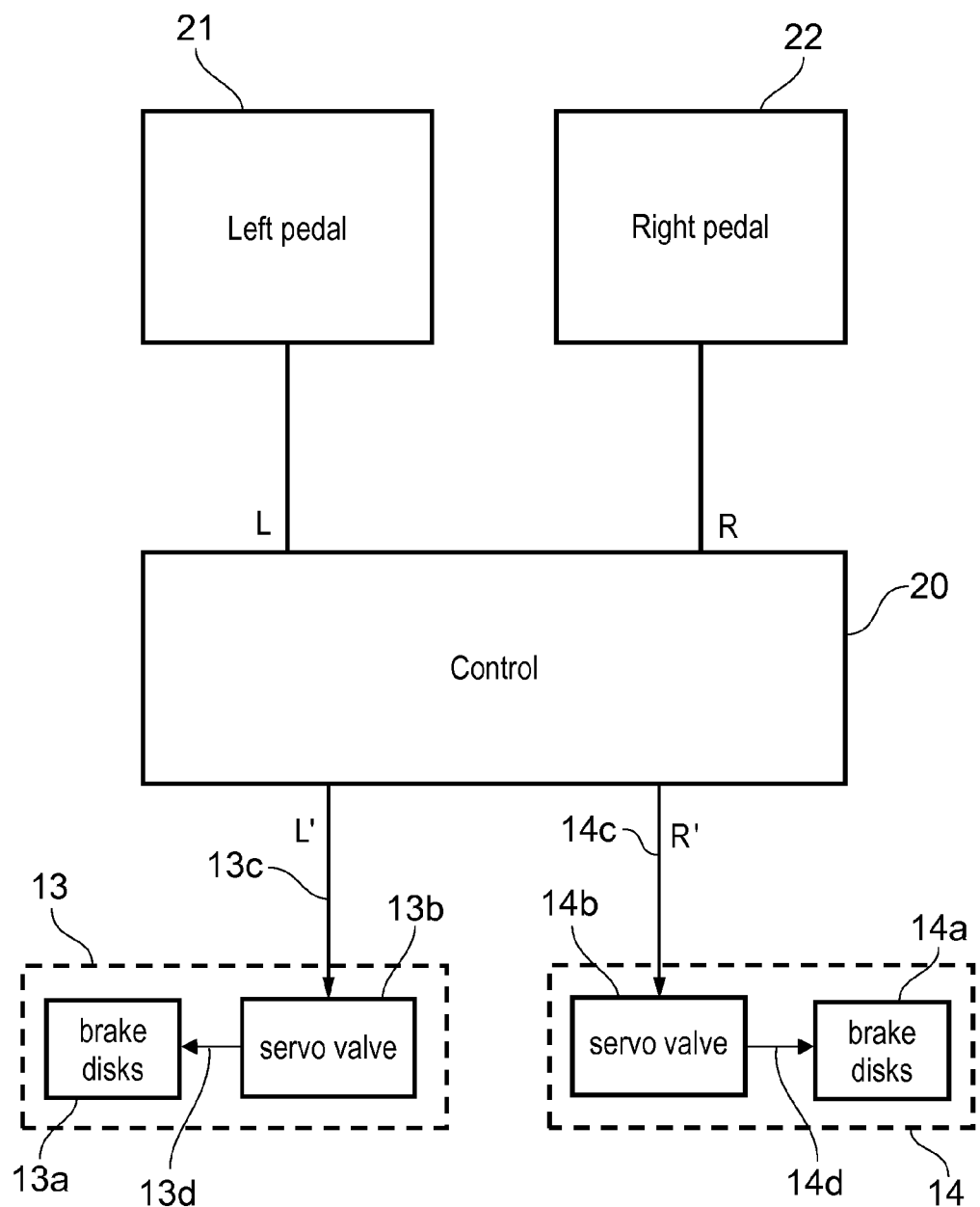
FIG. 2 is a schematic diagram illustrating a control system for controlling the brakes.

The aircraft 1 includes a cockpit braking control system 20 shown in FIG. 2 which receives command inputs from a pair of left and right brake pedals 21, 22 operated by the pilot. During normal operation, as the left pedal 21 is depressed, increased hydraulic pressure is applied to the left brake disks 13a, and as the right pedal 22 is depressed, increased hydraulic pressure is applied to the right brake disks 14a. The relationship between pedal position and hydraulic pressure is shown in Table 2 below—as the pedal is depressed the pressure rises slowly initially then rises more quickly toward the limit of travel of the pedal. In the description below the hydraulic pressure commanded by the left pedal 21 is referred to as a desired left braking parameter L. Similarly, the hydraulic pressure commanded by the right pedal 22 is referred to as a desired right braking parameter R.

The system 20 receives the desired braking parameters L, R as inputs from the pedals 21, 22 and is programmed by computer software to generate output braking parameters L', R' which are output to the brakes 13, 14 as shown in FIG. 2 so that the brakes 13, 14 apply the specified output braking parameters to their respective wheels. The system 20 is programmed to apply the logic shown in FIGS. 3 and 4 to generate these output braking parameters L', R'.

Figure 3:
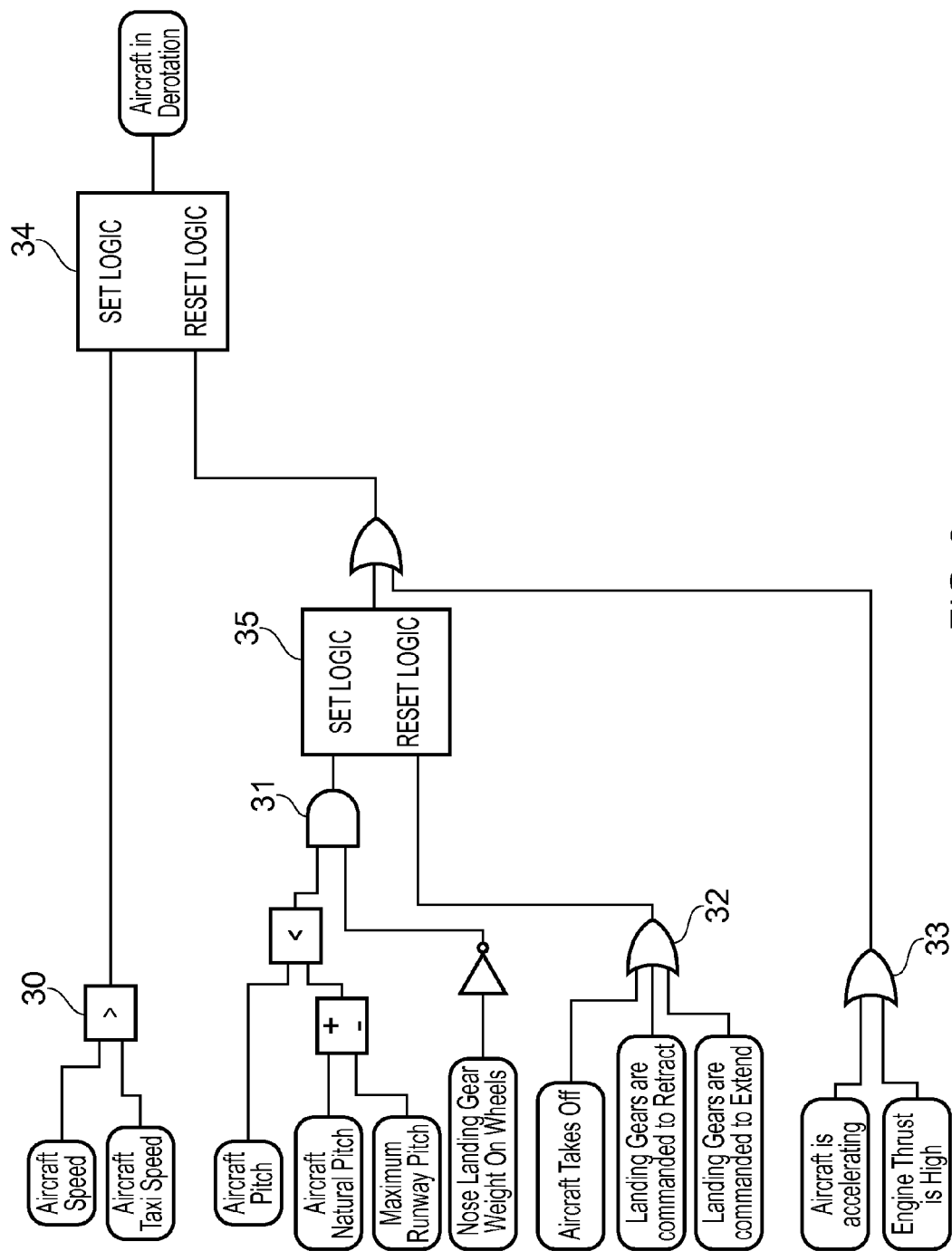
FIG. 3 is a logic chart showing how the control system determines that the aircraft is in a de-rotation phase.

Firstly, the system 20 determines whether the aircraft is in a de-rotation phase by applying the logic shown in FIG. 3. The de-rotation phase is the time in a flight immediately after touchdown when the MLG assemblies 11, 12 are on the ground but the NLG 10 is not. Set/reset logic blocks 34, 35 are set once the conditions for setting the block are met, then the state remains true even if the conditions are subsequently lost. The state remains true until the conditions for resetting the logic are met.

The logic of FIG. 3 determines that the aircraft is in this de-rotation phase when: a) the aircraft speed is greater than the taxi speed (as determined at logic block 30); b) the nose landing gear is not on the ground or the aircraft pitch is greater than the natural pitch plus an offset to account for runway slope (as determined by AND logic block 31); c) the aircraft has previously taken off or the landing gears have been extended or retracted (as determine by OR logic block 32); and d) the aircraft is not accelerating or experiencing high engine thrust (as determined by OR logic block 33). This last logic block 33 ensures that the control system 20 can distinguish between the de-rotation phase during landing and a similar rotation phase during take-off.

Figure 4:
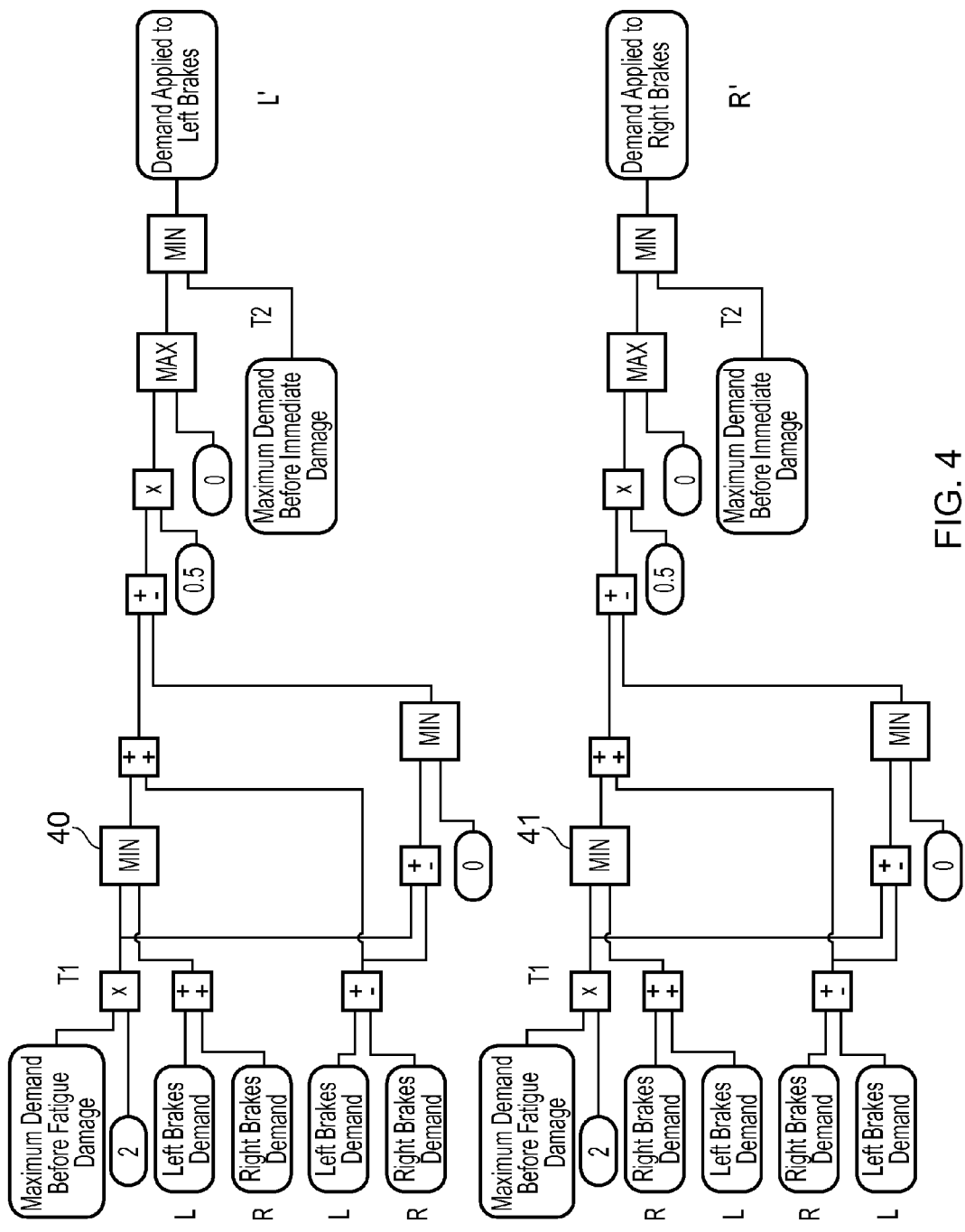
FIG. 4 is a logic chart showing how the control system determines the output braking parameters.

When the system 20 determines that the aircraft is in the de-rotation phase by applying the logic of FIG. 3, then it applies the logic of FIG. 4 to convert the desired braking parameters L, R into the output braking parameters L', R'. The top half of FIG. 4 shows the logic for determining the left braking parameter L' and the bottom half of FIG. 4 shows the logic for determining the right braking parameter R'.

The logic of FIG. 4 has a number of logic states (labelled as logic states A-F in Table 1 below) which are designed to apply differential braking during de-rotation without causing damage to the aircraft.

The system 20 determines at MIN logic blocks 40, 41 whether a sum (L+R) of the left and right braking parameters exceeds a threshold (T1). Each MIN logic block 40, 41 outputs the lowest one of its two inputs. The threshold T1 is set at a level above which there is a risk of fatigue damage being applied to the NLG 10 and other parts of the front of the aircraft due to a high de-rotation rate as the NLG 10 touches down. If the sum (L+R) does not exceed this threshold T1 then the system 20 enters logic state A and brakes the left and right brakes with the desired left and right braking parameters (L, R) respectively. In other words, L'=L and R'=R.

If the sum (L+R) is greater than T1, then the system 20 determines a differential braking parameter (Δ=L−R or R−L) which is the difference between the demand on the left brakes and the demand on the right brakes. The system 20 enters logic state B and sets L' and R' above and below ½ (T1) by equal amounts, maintaining the differential braking parameter so that L'−R'=L−R (and equivalently R'−L'=R−L).

In logic state B, for a differential demand Δ in which L>R (i.e. for a left turn), half is added to L', and the other half is removed from R'. Logic state B continues until no more can be removed from R' (i.e. R=0) at which point the system enters logic state C and all the extra demand is added to L'. Logic state C continues up to a maximum threshold T2 which would cause immediate structural damage to the front of the aircraft. The system then enters the logic state E, limiting L' to T2.

Similarly for a differential demand Δ in which R>L (i.e. for a right turn), half is added to R', and the other half is removed from L'. Logic state B continues until no more can be removed from L' (i.e. L'=0) at which point the system enters logic state D and all the extra demand is added to R'. Logic state D continues up to the maximum threshold T2 at which point the system enters the logic state F, limiting R' to T2.

So when the system is in logic state B, the left wheel is braked with a reduced left braking parameter L' which is less than the desired left braking parameter L, and similarly the right wheel is braked with a reduced right braking parameter R' which is less than the desired right braking parameter R. The braking parameters are reduced by the same amount in order to maintain the differential braking parameter (Δ=L−R or R−L), so that L'−R'=L−R (or equivalently R'−L'=R−L).

TABLE 1

| Logic State | L + R | L − R | R − L | L' | R' |
|---|---|---|---|---|---|
| | L + R < T1, desired braking is below fatigue damage threshold (T1), no control required: | | | | |
| A | <T1 | <T1 | <T1 | L | R |
| | T1 < L + R < T2, desired braking is above T1, control applied, differential maintained: | | | | |
| B | >T1 | <T1 | <T1 | (T1 + L − R)/2 | (T1 + R − L)/2 |
| C (R' = 0) | | T1 < L − R < T2 | | L − R | 0 |
| D (L' = 0) | >T1 | | T1 < R − L < T2 | 0 | R − L |
| | L + R > T2, desired braking above immediate damage threshold (T2), L' or R' limited to T2: | | | | |
| E | | >T2 | | T2 | 0 |
| F | | | >T2 | 0 | T2 |

Also, a sum (L'+R') of the reduced braking parameters is set by the logic to be equal to the threshold T1.

Logic state B continues until the differential braking parameter Δ exceeds T1. At this point then as long as the differential braking parameter Δ is less than T2, then the system enters logic state C or D, operating a first one of the brakes with the differential braking parameter Δ and applying no braking torque with the other brake.

When the differential braking parameter Δ exceeds T2, then the system 20 enters logic state E or F, limiting the first one of the brakes to the threshold braking parameter T2 whilst maintaining zero braking torque with the other brake.

Table 2 below gives an example of left and right pedal positions and their associated braking parameters and logic states, based on a lower threshold value T1 of 75% and an upper threshold value T2 of 100%. In this example T2 is set fairly high so the controller does not enter logic state E or F.

TABLE 2

| Left Pedal Position | Right Pedal Position | Desired Left Braking Parameter L | Desired Right Braking Parameter R | Left output braking parameter L' | Right output braking parameter R' | Logic State |
|---|---|---|---|---|---|---|
| 0 | 0 | 0% | 0% | 0% | 0% | A |
| 5 | 0 | 0% | 0% | 0% | 0% | A |
| 10 | 0 | 0% | 0% | 0% | 0% | A |
| 15 | 0 | 12% | 0% | 12% | 0% | A |
| 20 | 0 | 14% | 0% | 14% | 0% | A |
| 25 | 0 | 16% | 0% | 16% | 0% | A |
| 30 | 0 | 17% | 0% | 17% | 0% | A |
| 35 | 0 | 19% | 0% | 19% | 0% | A |
| 40 | 0 | 23% | 0% | 23% | 0% | A |
| 45 | 0 | 28% | 0% | 28% | 0% | A |
| 50 | 0 | 32% | 0% | 32% | 0% | A |
| 55 | 0 | 37% | 0% | 37% | 0% | A |
| 60 | 0 | 43% | 0% | 43% | 0% | A |
| 65 | 0 | 49% | 0% | 49% | 0% | A |
| 70 | 0 | 61% | 0% | 61% | 0% | A |
| 75 | 0 | 75% | 0% | 75% | 0% | A |
| 80 | 0 | 89% | 0% | 89% | 0% | C |
| 85 | 0 | 100% | 0% | 100% | 0% | C |
| 90 | 0 | 100% | 0% | 100% | 0% | C |
| 95 | 0 | 100% | 0% | 100% | 0% | C |
| 100 | 0 | 100% | 0% | 100% | 0% | C |
| 100 | 0 | 100% | 0% | 100% | 0% | C |
| 100 | 5 | 100% | 0% | 100% | 0% | C |
| 100 | 10 | 100% | 0% | 100% | 0% | C |
| 100 | 15 | 100% | 12% | 88% | 0% | C |
| 100 | 20 | 100% | 14% | 86% | 0% | C |
| 100 | 25 | 100% | 16% | 84% | 0% | C |
| 100 | 30 | 100% | 17% | 83% | 0% | C |
| 100 | 35 | 100% | 19% | 81% | 0% | C |
| 100 | 40 | 100% | 23% | 77% | 0% | C |
| 100 | 45 | 100% | 28% | 74% | 2% | B |
| 100 | 50 | 100% | 32% | 72% | 4% | B |
| 100 | 55 | 100% | 37% | 69% | 6% | B |
| 100 | 60 | 100% | 43% | 67% | 9% | B |
| 100 | 65 | 100% | 49% | 63% | 12% | B |
| 100 | 70 | 100% | 61% | 57% | 18% | B |
| 100 | 75 | 100% | 75% | 50% | 25% | B |
| 100 | 80 | 100% | 89% | 43% | 32% | B |
| 100 | 85 | 100% | 100% | 38% | 38% | B |
| 100 | 90 | 100% | 100% | 38% | 38% | B |
| 100 | 95 | 100% | 100% | 38% | 38% | B |
| 100 | 100 | 100% | 100% | 38% | 38% | B |
| 100 | 100 | 100% | 100% | 38% | 38% | B |
| 95 | 100 | 100% | 100% | 38% | 38% | B |
| 90 | 100 | 100% | 100% | 38% | 38% | B |
| 85 | 100 | 100% | 100% | 38% | 38% | B |
| 80 | 100 | 89% | 100% | 32% | 43% | B |
| 75 | 100 | 75% | 100% | 25% | 50% | B |
| 70 | 100 | 61% | 100% | 18% | 57% | B |
| 65 | 100 | 49% | 100% | 12% | 63% | B |
| 60 | 100 | 43% | 100% | 9% | 67% | B |
| 55 | 100 | 37% | 100% | 6% | 69% | B |
| 50 | 100 | 32% | 100% | 4% | 72% | B |
| 45 | 100 | 28% | 100% | 2% | 74% | B |
| 40 | 100 | 23% | 100% | 0% | 77% | D |
| 35 | 100 | 19% | 100% | 0% | 81% | D |
| 30 | 100 | 17% | 100% | 0% | 83% | D |
| 25 | 100 | 16% | 100% | 0% | 84% | D |
| 20 | 100 | 14% | 100% | 0% | 86% | D |
| 15 | 100 | 12% | 100% | 0% | 88% | D |
| 10 | 100 | 0% | 100% | 0% | 100% | D |
| 5 | 100 | 0% | 100% | 0% | 100% | D |
| 0 | 100 | 0% | 100% | 0% | 100% | D |

Although the invention has been described above with reference to one or more preferred embodiments, it will be appreciated that various changes or modifications may be made without departing from the scope of the invention as defined in the appended claims.

For example the system 20 described above receives the desired braking parameters L, R as direct inputs from two pedals 21, 22, but in alternative embodiments of the invention the pedals 21, 22 may be replaced by other user input devices. In one embodiment of the invention the pilot may input the total hydraulic pressure (equivalent to L+R in the embodiment above) with a first user input device, and the differential braking parameter Δ (positive for a left turn, negative for a right turn) with a second user input device. In another embodiment of the invention, a single control stick may be used to input both the total braking force (L+R) by moving the control stick backwards and forwards, and the differential braking parameter Δ by moving the control stick left and right.

In the embodiment described above, the control logic of FIG. 4 is only used if the aircraft is in a de-rotation phase as determined by the logic of FIG. 3. In alternative embodiments of the invention, similar control logic can be used to limit the loads on other pieces of structure in other critical phases (for example, during low-speed taxi) using different values for T1 and T2.

The invention claimed is:

1. A method of braking left and right landing gear wheels on respective left and right sides of an aircraft, the method comprising: receiving a desired left braking hydraulic pressure, braking torque, or angular deceleration (L) for the left wheel; receiving a desired right braking hydraulic pressure, braking torque, or angular deceleration (R) for the right wheel; braking the left wheel with a reduced left braking hydraulic pressure, braking torque, or angular deceleration (L') which is less than the desired left braking hydraulic pressure, braking torque, or angular deceleration (L); and braking the right wheel with a reduced right braking hydraulic pressure, braking torque, or angular deceleration (R') which is less than the desired respective right braking hydraulic pressure, braking torque, or angular deceleration (R), wherein L'−R'=L−R.

2. The method of claim 1, further comprising determining whether a sum (L+R) of the left and right desired braking hydraulic pressure, braking torque, or angular deceleration exceeds a threshold; braking the left and right wheels with the desired left and right braking hydraulic pressure, braking torque, or angular deceleration (L, R) respectively in response to the determining whether a sum (L+R) of the left and right desired braking hydraulic pressure, braking torque, or angular deceleration exceeds a threshold being a determination that the sum (L+R) does not exceed the threshold; and braking the left and right wheels with the reduced left and right braking hydraulic pressure, braking torque, or angular deceleration (L', R') respectively in response to the determining whether a sum (L+R) of the left and right desired braking hydraulic pressure, braking torque, or angular deceleration exceeds a threshold being a determination that the sum (L+R) exceeds the threshold.

3. The method of claim 2, wherein a sum (L'+R') of the reduced braking hydraulic pressure, braking torque, or angular deceleration is substantially equal to the threshold.

4. The method of claim 1, further comprising determining a differential braking hydraulic pressure, braking torque, or angular deceleration indicative of a difference between the desired braking hydraulic pressure, braking torque, or angular deceleration; determining whether the differential braking hydraulic pressure, braking torque, or angular deceleration exceeds a threshold braking hydraulic pressure, braking torque, or angular deceleration; braking a first one of the wheels with the differential braking hydraulic pressure, braking torque, or angular deceleration in response to the determining whether the differential braking hydraulic pressure, braking torque, or angular deceleration exceeds a threshold braking hydraulic pressure, braking torque, or angular deceleration being a determination that the differential braking hydraulic pressure, braking torque, or angular deceleration does not exceed the threshold braking hydraulic pressure, braking torque, or angular deceleration; and braking the first one of the wheels with the threshold braking hydraulic pressure, braking torque, or angular deceleration in response to the determining whether the differential braking hydraulic pressure, braking torque, or angular deceleration exceeds a threshold braking hydraulic pressure, braking torque, or angular deceleration being a determination that the differential braking hydraulic pressure, braking torque, or angular deceleration does exceed the threshold braking hydraulic pressure, braking torque, or angular deceleration.

5. A method of braking first and second landing gear wheels on respective first and second sides of an aircraft, the method comprising: receiving a first desired braking hydraulic pressure, braking torque, or angular deceleration for the first wheel; receiving a second desired braking hydraulic pressure, braking torque, or angular deceleration for the second wheel, wherein the second desired braking hydraulic pressure, braking torque, or angular deceleration is lower than the first desired braking hydraulic pressure, braking torque, or angular deceleration; determining a differential braking hydraulic pressure, braking torque, or angular deceleration indicative of a difference between the desired braking hydraulic pressure, braking torque, or angular deceleration; determining whether the differential braking hydraulic pressure, braking torque, or angular deceleration exceeds a threshold braking hydraulic pressure, braking torque, or angular deceleration; braking the first wheel with the differential braking hydraulic pressure, braking torque, or angular deceleration in response to the determining whether the differential braking hydraulic pressure, braking torque, or angular deceleration exceeds a threshold braking hydraulic pressure, braking torque, or angular deceleration being a determination that the differential braking hydraulic pressure, braking torque, or angular deceleration does not exceed the threshold braking hydraulic pressure, braking torque, or angular deceleration; and braking the first wheel with the threshold braking hydraulic pressure, braking torque, or angular deceleration in response to the determining whether the differential braking hydraulic pressure, braking torque, or angular deceleration exceeds a threshold braking hydraulic pressure, braking torque, or angular deceleration being a determination that the differential braking hydraulic pressure, braking torque, or angular deceleration does exceed the threshold braking hydraulic pressure, braking torque, or angular deceleration.

6. The method of claim 5 wherein no braking torque is applied to the second wheel when the first wheel is braked with the differential braking hydraulic pressure, braking torque, or angular deceleration, and no braking torque is applied to the second wheel when the first wheel is braked with the threshold braking hydraulic pressure, braking torque, or angular deceleration.

7. The method of claim 1, wherein the landing gear wheels are on opposite sides of a plane of symmetry of an airframe of the aircraft.

8. The method of claim 1, wherein the desired braking hydraulic pressure, braking torque, or angular deceleration are received from a human pilot via one or more user input devices.

9. The method of claim 1, wherein the aircraft is in a de-rotation phase after landing in which the landing gear wheels are on the ground but a nose landing gear of the aircraft is not on the ground.

10. The method of claim 1, further comprising determining whether the aircraft is in a de-rotation phase after landing in which the landing gear wheels are on the ground but a nose landing gear of the aircraft is not on the ground, and performing the method in response to a determination that the aircraft is in the de-rotation phase.

11. A system for controlling an aircraft braking system for an aircraft having left and right brakes, comprising:
a braking control system programmed to control the left and right brakes by: receiving a desired left braking hydraulic pressure, braking torque, or angular deceleration (L) for the left brake; receiving a desired right braking hydraulic pressure, braking torque, or angular deceleration (R) for the right brake; determining a reduced left braking hydraulic pressure, braking torque, or angular deceleration (L') which is less than the desired left braking hydraulic pressure, braking torque, or angular deceleration (L); determining a reduced right braking hydraulic pressure, braking torque, or angular deceleration (R') which is less than the desired respective right braking hydraulic pressure, braking torque, or angular deceleration (R), wherein L'−R'=L−R; and outputting the reduced braking hydraulic pressure, braking torque, or angular deceleration to the left and right brakes.

12. A system for controlling an aircraft braking system for an aircraft having first and second brakes, comprising:
a braking control system programmed to control the first and second brakes by:
receiving a first desired braking hydraulic pressure, braking torque, or angular deceleration for the first brake; receiving a second desired braking hydraulic pressure, braking torque, or angular deceleration for the second brake, wherein the second desired braking hydraulic pressure, braking torque, or angular deceleration is lower than the respective first desired braking hydraulic pressure, braking torque, or angular deceleration; determining a differential braking hydraulic pressure, braking torque, or angular deceleration indicative of a difference between the desired braking hydraulic pressure, braking torque, or angular deceleration; determining whether the differential braking hydraulic pressure, braking torque, or angular deceleration exceeds a threshold braking hydraulic pressure, braking torque, or angular deceleration; outputting the differential braking hydraulic pressure, braking torque, or angular deceleration to the first brake in response to the determining whether the differential braking hydraulic pressure, braking torque, or angular deceleration exceeds a threshold braking hydraulic pressure, braking torque, or angular deceleration being a determination that the differential braking hydraulic pressure, braking torque, or angular deceleration does not exceed the threshold braking hydraulic pressure, braking torque, or angular deceleration; and outputting the threshold braking hydraulic pressure, braking torque, or angular deceleration to the first brake in response to the determining whether the differential braking hydraulic pressure, braking torque, or angular deceleration exceeds a threshold braking hydraulic pressure, braking torque, or angular deceleration being a determination that the differential braking hydraulic pressure, braking torque, or angular deceleration does exceed the threshold braking hydraulic pressure, braking torque, or angular deceleration.

13. A non-transitory computer-readable medium having computer-executable instructions embodied thereon that, when executed, perform a method of braking left and right landing gear wheels on respective left and right sides of an aircraft, comprising: receiving a desired left braking hydraulic pressure, braking torque, or angular deceleration (L) for the left wheel; receiving a desired right braking hydraulic pressure, braking torque, or angular deceleration (R) for the right wheel; braking the left wheel with a reduced left braking hydraulic pressure, braking torque, or angular deceleration (L') which is less than the respective desired left braking hydraulic pressure, braking torque, or angular deceleration (L); and braking the right wheel with a reduced right braking hydraulic pressure, braking torque, or angular deceleration (R') which is less than the respective desired right braking hydraulic pressure, braking torque, or angular deceleration (R), wherein L'−R'=L−R.

* * * * *